United States Patent
Sangouard et al.

(10) Patent No.: US 8,414,728 B2
(45) Date of Patent: Apr. 9, 2013

(54) COLLAR FOR TUBE AND RELATED METHODS OF MANUFACTURE AND INSTALLATION

(75) Inventors: Gilles Sangouard, Simandres (FR); Jacques Bertholet, Morestel (FR)

(73) Assignee: Freyssinet, Velizy Villacoublay (FR)

(*) Notice: Subject to any disclaimer, the term of this patent is extended or adjusted under 35 U.S.C. 154(b) by 871 days.

(21) Appl. No.: 12/219,951

(22) Filed: Jul. 30, 2008

(65) Prior Publication Data

US 2009/0041979 A1   Feb. 12, 2009

(30) Foreign Application Priority Data

Aug. 9, 2007  (FR) .................................... 07 05801

(51) Int. Cl.
*B32B 37/00* (2006.01)
*B32B 37/14* (2006.01)
*B32B 38/00* (2006.01)
*B32B 38/14* (2006.01)

(52) U.S. Cl. ........ 156/263; 156/211; 156/212; 156/213; 156/215; 156/250; 156/252; 156/253; 156/256

(58) Field of Classification Search ................. 156/211, 156/212, 213, 215, 250, 252, 253, 256, 263; 428/137, 174

See application file for complete search history.

(56) References Cited

U.S. PATENT DOCUMENTS

| 2,882,183 A * | 4/1959 | Bond et al. ............... 442/151 |
| 4,086,736 A | 5/1978 | Landrigan |
| 4,772,507 A * | 9/1988 | Leo et al. ............... 428/218 |
| 5,006,185 A * | 4/1991 | Anthony et al. ............ 156/193 |
| 5,662,974 A | 9/1997 | Andrenacci et al. |
| 6,460,576 B2 * | 10/2002 | Vitoorapakorn ............ 138/149 |
| 2007/0110942 A1 * | 5/2007 | Shah et al. ............... 428/40.1 |

FOREIGN PATENT DOCUMENTS

EP   1312466 A1   5/2003

* cited by examiner

*Primary Examiner* — Mark A Osele
*Assistant Examiner* — Christopher C Caillouet
(74) *Attorney, Agent, or Firm* — McKenna Long & Aldridge LLP

(57) ABSTRACT

The invention proposes a collar intended to be placed around a portion of a tube and in contact with a separator between a first space and a second space. The collar has a generally annular shape and comprises a superimposition of alternating layers of silicone adhesive and fabrics and an upper layer of silicone elastomer.

6 Claims, 4 Drawing Sheets

COLLAR FOR TUBE AND RELATED METHODS OF MANUFACTURE AND INSTALLATION

This application claims priority to French Application No. 07 05801 filed on Aug. 9, 2007, which is hereby incorporated by reference in its entirety.

BACKGROUND OF THE INVENTION

The present invention relates to the tightness around tubes.

In particular, but not exclusively, the invention relates to the tightness around transfer tubes of nuclear power plants.

As shown in FIG. 1, a nuclear power plant generally comprises a reactor building 4 containing a primary circuit C1 and the nuclear reactor 5. Fuel rods, in which fission products are confined, are arranged in the form of assemblies in the reactor 5.

The subsequent fission creates heat. Pressurized water is used as coolant. The water contained in the primary circuit C1 transmits its heat to water contained in a secondary circuit C2. This heat exchange is carried out using one or more steam generators GV.

Once heated, the water of the secondary circuit C2 turns into steam. This high-pressure steam turns a turbine driving an alternating current generator which produces electricity. After passing through the turbine, the steam is re-cooled, turned back into water, and returned to the steam generator(s) GV for a fresh cycle.

A fuel building 6 also adjoins the reactor building 4. A space between concrete containment walls 3 acts as a separator between these two buildings. The fuel building 6 contains a cooling pond 7. The latter, which is filled with water, receives the spent fuel from the reactor building 4 for a period sufficient to allow the fuel assemblies to cool.

Spent fuel is transferred between the reactor building 4 and the fuel building 6 using a connecting tunnel called a "transfer tube". This transfer tube 1 therefore crosses the space between concrete containment walls 3 and opens at one of its ends (on the left in FIG. 1), into the water of the cooling pond 7. Its other end (on the right in FIG. 1) opens into a generally submerged part of the reactor building 4.

In order to protect the transfer tube 1, it is known to use a compensator (not represented in FIG. 1) as well as a tightness collar 2. The latter was fitted during the construction of the power station, by being slid on one of the ends of the transfer tube 1, before the latter is immersed in the water of the cooling pond 7. As shown in FIG. 1, it is placed around a portion of the transfer tube 1 and in contact with the space between the containment walls 3 which act as a separator between the reactor building 4 and the fuel building 6. It is generally placed on the side of the fuel building 6, as shown in FIG. 1. Alternatively, this collar can be placed to seal the transfer tube on the side of the reactor building 4 (reference 2' in FIG. 1). Two collars can optionally be positioned on either side of the space between containment walls 3.

Such a collar is usually composed of a single block of ethylene and propylene reinforced with fabric, able to withstand up to 20 kg/cm. It is designed not to burst suddenly in case of overpressure, typically of three relative bars.

Although of proven effectiveness, the existing collars can fail or experience a degree of wear. In some cases, the degradation of the collars is linked with the fact that the nuclear power plants in which they are installed are still in service several years beyond their initially scheduled lifespan.

A replacement of the existing collars can therefore be necessary in certain situations. However, the fitting of a new collar to a transfer tube of a power station already in service is not easy, particularly because the ends of the transfer tube are not easily accessible.

Similar problems arise in fields other than that of nuclear power plants. Collars can be used to seal a tube connecting two spaces, at least one of which can contain a fluid (for example sterilized air, gas, contaminated or polluted water, etc) or substances to be confined in this space.

This can be the case for example in factories manufacturing medicaments, heating networks (waste incineration plants connected to the hot water network), thermal combustion power stations (coal, fuel oil or gas) which include confined spaces crossed by tubes, passage through which must be completely tight and made secure, etc.

An object of the present invention is to propose a collar having the required properties for sealing a tube and which is relatively easy to install in a location already in service.

SUMMARY OF THE INVENTION

The invention thus proposes a method for producing a collar intended to be placed around a portion of a tube and in contact with a separator between a first space and a second space. The method comprises the following steps:

/a/ applying a first layer of silicone adhesive on top of one surface of a mould, said surface of the mould having a generally annular shape;

/b/ applying a first fabric, previously cut to a defined template, to the first layer of silicone adhesive;

/c/ repeating steps /a/ and /b/ in order to obtain a predetermined number of superimposed alternating layers of silicone adhesive and fabrics; and /d/ applying a layer of silicone elastomer to said superimposed layers.

The constitution of the collar thus produced, based on fabric and silicone, allows it to have the properties required to seal the tube.

When it is applied to the nuclear field, the invention then advantageously relates to the manufacture of a collar intended to be placed around a portion of a transfer tube and in contact with a separator between a reactor building and a fuel building of a nuclear power plant. Of course, other applications can equally be envisaged within the framework of the present invention, as indicated in the introduction.

According to advantageous embodiments which can be combined in all conceivable ways:

the surface of the mould is waxed before step /a/;

the first layer of silicone adhesive is applied onto an initial layer of silicone applied, before step /a/, onto said surface of the mould;

the initial layer of silicone is applied, before step /a/, to said surface of the mould using a scraper fitted on the mould;

each fabric is impregnated with the layer of silicone adhesive to which it is applied, over all of an internal surface of said fabric, excluding a determined angular sector;

the impregnation of each fabric is carried out using a roller passed over all of an external surface of said fabric, excluding said determined angular sector;

each layer of silicone adhesive is applied all around the surface of the mould, excluding said determined angular sector;

steps /a/ and /b/ are repeated after a suitable drying time of the last layer of silicone adhesive applied;

at the end of steps /a/-/d/, the lower and upper edges of the collar are cut off uniformly;

at the end of steps /a/-/d/, apertures are drilled, according to an angular distribution, through the whole thickness of the collar, such that said apertures can cooperate with corresponding studs of the tube and/or the separator;

at least one fabric of said layering is a glass fabric;

said predetermined number of alternating layers of silicone adhesive and fabrics is five;

moreover, the layer of silicone elastomer and the fabrics of said layering is cut such that the collar is open over a determined angular sector;

on said determined angular sector, the fabrics of said layering are not impregnated with the layer of silicone adhesive to which they are respectively applied;

the determined angular sector is delimited by two generatrices and each layer of the silicone elastomer and of the fabrics of said layering is cut away along only one of the two generatrices;

the layer of silicone elastomer and the fabrics of said layering are cut away alternately along one or other of the two generatrices.

The invention also proposes a collar intended to be placed around a portion of a tube and in contact with a separation between a first space and a second space. This collar has a generally annular shape and comprises alternating superimposed layers of silicone adhesive and fabrics and an upper layer of silicone elastomer.

This collar is advantageously obtained by using the above mentioned method of manufacture.

The invention also proposes a method for installing such a collar around a portion of a tube and in contact with a separator between a first space and a second space, the upper layer of silicone elastomer and the fabrics of said layering having been cut in such a way that the collar is open over a determined angular sector. This method of installation comprises the following steps:

introducing the collar around the tube, at the point where the collar is open, so that it comes into contact with the separator; and successively placing the cut-away fabrics and the upper layer of silicone elastomer on the determined angular sector, in order to close the collar around said portion of the tube.

This method thus allows easy installation of the collar, optionally replacing a pre-existing collar, even if the power station where it is installed is already in service.

In particular, the fact that the collar is open over the determined angular sector, combined with the properties in particular of flexibility of the fabric and the silicone, allows an easy introduction around the tube.

The reconstituting of the collar is simple and effective.

According to advantageous embodiments which can be combined in all conceivable ways:

each of the cut-away fabrics is covered with a layer of silicone adhesive;

said layer of silicone adhesive is similar to the layers of silicone adhesive of said layering;

corresponding studs on the tube and/or the separator are introduced into the apertures drilled through the whole thickness of the collar, according to an angular distribution;

the collar is fixed to the tube and the separator using respective reinforcements.

DESCRIPTION OF PREFERRED EMBODIMENTS

The invention will be described in more detail below in its non-limitative application to the nuclear field, i.e. in relation to a collar intended to be placed around a portion of a transfer tube and in contact with a separator between a reactor building (first space) and a fuel building (second space) of a nuclear power plant.

Figure 1:
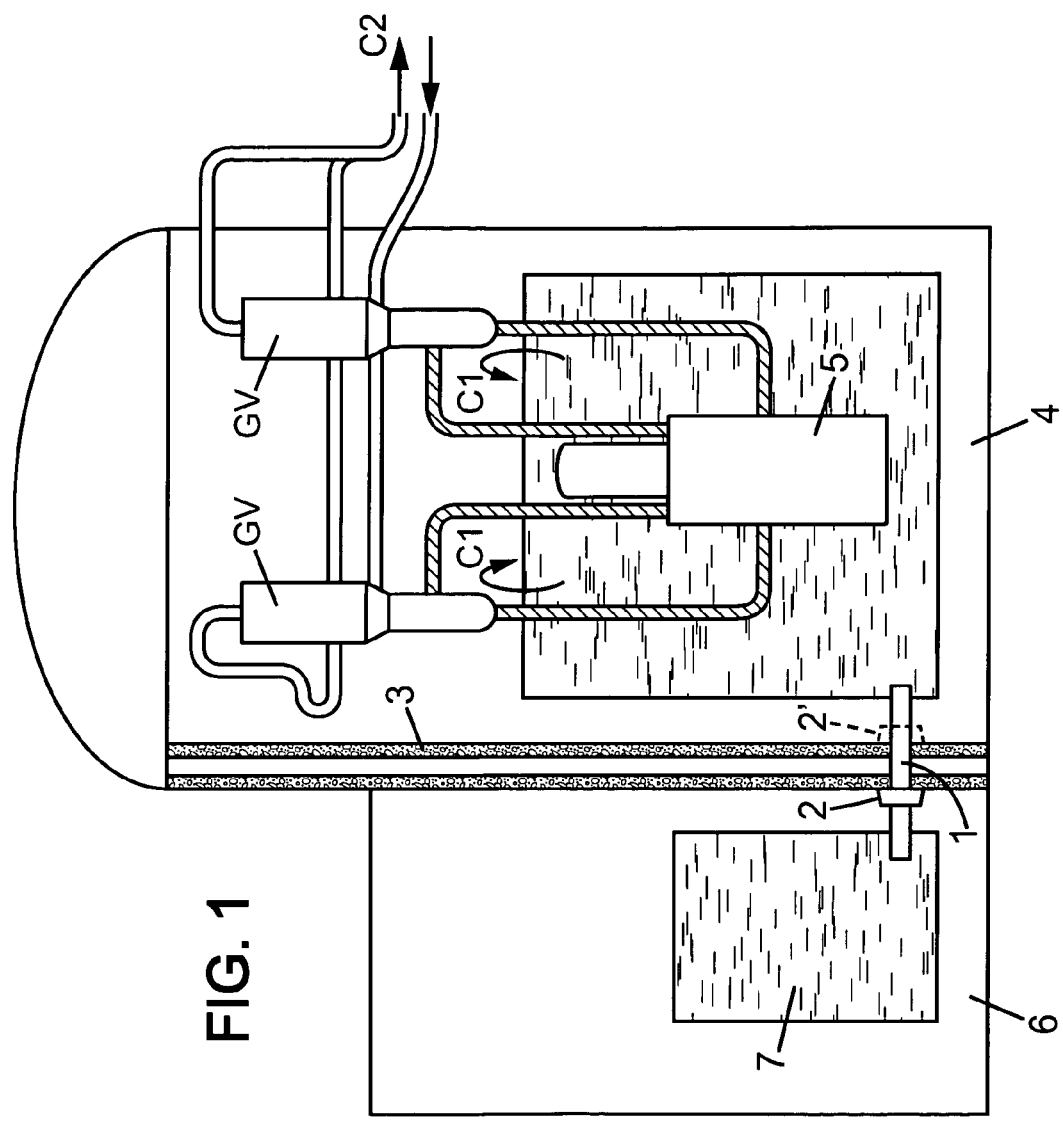
FIG. 1, already described, is a partial diagram of a nuclear power plant using a collar according to the state of the art.

The manufacture of a collar is described below with reference to FIGS. 2 and 3. As explained in the introduction, this collar 8 is intended to be placed around a portion of a transfer tube and in contact with a separator between a reactor building and a fuel building of a nuclear power plant. In particular, this collar can be intended to replace an existing collar such as collar 2 (or collar 2') in FIG. 1. The replacement takes place for example when the existing collar shows signs of wear or failure, or when such signs are expected.

A specific mould 9 is used for the manufacture of the collar 8. This mould 9 has a generally annular shape. By "annular", is meant closing in on itself. Thus, a circular cross section, but also rectangular, triangular, polygonal, etc. can be suitable for the mould 9. The cross section can moreover vary over the length of the mould.

Figure 3:
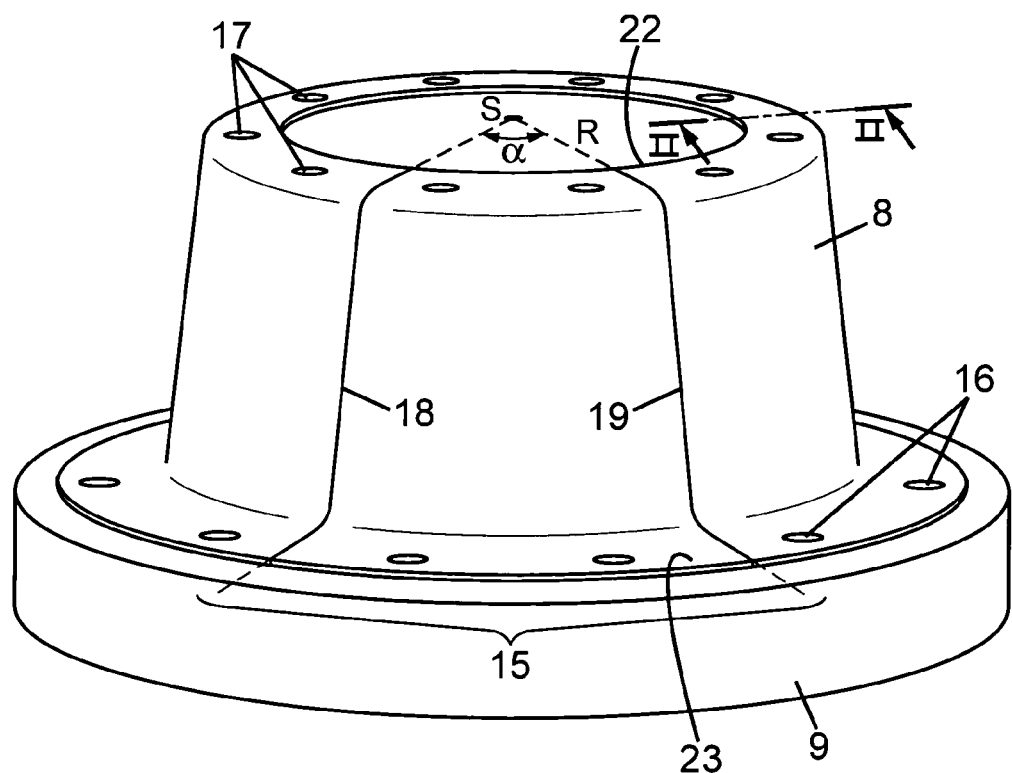
FIG. 3 is a diagram showing a step in the manufacture of a collar according to the invention.

In the example illustrated in FIG. 3, the mould 9 is in the shape of a hat. More precisely, the example illustrated shows a substantially cylindrical surface of the mould extended by a part projecting inside the cylinder at the top of the upper part of the mould and a part projecting outside the cylinder at the bottom of the upper part of the mould. Of course, other generally annular shapes of the mould 9 can also be envisaged, such as a substantially frustoconical or other shape.

In the following, it is assumed that the collar 8 will be formed on the upper part of the mould 9, as shown in FIG. 3.

Advantageously, the surface of the mould 9 on which the collar 8 will be formed is previously waxed using any wax. This optional step makes it possible to remove the collar 8 easily once the manufacture of the latter is complete.

Advantageously, an initial layer of silicone adhesive is applied to the surface of the mould 9. This first layer thus forms a support layer for the collar, allowing its lower and upper limits to be determined. It is advantageously applied to the surface of the mould 9 using a scraper fitted on the mould, in order to have a homogeneous thickness over the whole of its surface.

When it is formed, this initial layer of silicone adhesive is left to dry for a suitable time. This time depends in particular on the properties of the silicone adhesive used and the thickness of the layer applied to the mould. This suitable drying time can easily be determined by a person skilled in the art according to the particular case.

Figure 2:
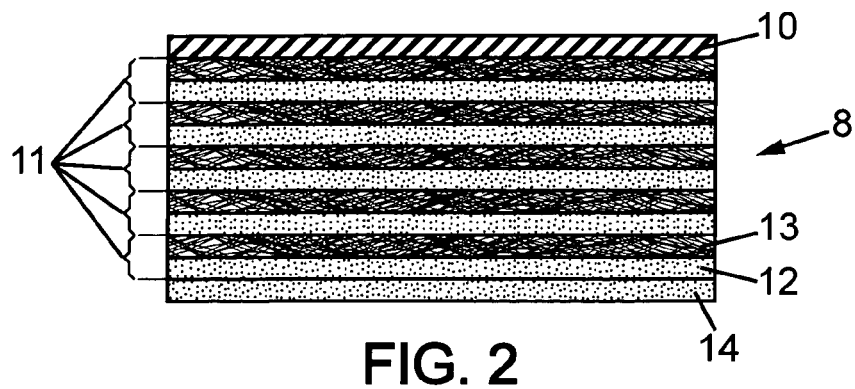
FIG. 2 is a sectional view of an example of a collar according to the invention.

In FIG. 2, which shows a sectional view of the finished collar 8 in the direction of the thickness, along the axis II-II in FIG. 3, the initial layer of silicone adhesive is referenced 14 and constitutes the lowest layer of the collar 8.

A first layer of silicone adhesive 12 is applied on top of the surface of the mould 9. Where an initial layer of silicone adhesive 14 was previously applied to the mould, the first layer of silicone adhesive 12 is applied to this first layer 14, as shown in FIG. 2. Where no initial layer of silicone adhesive was applied to the mould, the first layer of silicone adhesive 12 is advantageously applied directly to the surface of the mould 9.

This first layer of silicone adhesive 12 is advantageously applied using a spreading knife or the scraper mentioned above.

A first fabric 13 is then applied to the first layer of silicone adhesive 12. This fabric was previously cut out according to a defined template. This template is advantageously chosen to correspond substantially to the whole circumference of the upper part of the mould 9, as shown in the FIG. 3.

Advantageously, the fabric 13 is impregnated with the layer of silicone adhesive 12 to which it is applied, over the whole of its internal surface, excluding a determined angular sector. This angular sector is shown in FIG. 3 by the zone 15 delimited by the generatrices 18 and 19, which are separated by an angle a from the top S of the mould 9. The angle a must be large enough to allow the introduction onto the transfer tube 1 of the collar 8 across the zone 15, it being understood that the silicone adhesive and the fabric composing the collar have a deformability, which allows them to increase the angular aperture of the zone 15 for the purposes of this introduction. By way of example, the angle a can be comprised between 30 and 90° C.

The impregnation of the fabric 13 by the silicone adhesive of the layer 12 over its entire internal surface, excluding the angular sector corresponding to the zone 15, can be carried out in various ways.

According to a first example, a roller is passed over all of the external surface of the fabric 13, excluding said angular sector. The passage of the roller allows the adhesive to enter between the interstices of the fabric wherever it is used. On the other hand, in the zone 15 over which the roller has not passed, the fabric 13 does not become impregnated with the silicone adhesive of the layer 12, or at any rate not in the same proportion as over the remainder of the internal surface of the fabric 13.

According to a second example, the layer of silicone adhesive 12 was applied on top of only part of the surface of the mould 9, which corresponds to the whole of the surface of the mould 9 excluding the angular sector corresponding to the zone 15. Such an absence of silicone adhesive in the zone 15 thus prevents any impregnation of the fabric 13 with adhesive over this zone.

Other techniques can of course be used to prevent the fabric 13 from being impregnated with adhesive in the zone 15, or at least reducing its impregnation relative to that over the remainder of its internal surface.

Advantageously, the fabric 13 was applied to the first layer of silicone adhesive 12 after a suitable drying time of the latter. This suitable drying time is determined as indicated above with reference to the layer 14.

The layer of silicone adhesive 12 and the fabric 13 form a first compound layer 11, hereafter called "ply".

The previously described steps are then repeated in order to obtain superimposed plies 11, each comprising one layer of silicone adhesive and one fabric. Thus alternating layers of silicone and fabrics can be obtained, as shown in FIG. 2.

The number of plies thus superimposed can be two or more. It is advantageously fixed in relation to a desired target for the strength of the collar. By way of example, a collar 8 comprising five superimposed plies can make it possible to obtain a resistance to a pressure of approximately three relative bars, when it is fitted on a transfer tube 1.

Once the superimposition of the plies is complete, a layer of silicone elastomer 10 is applied to this layering. This finishing layer 10 constitutes a tightness layer. Advantageously, it can be decontaminated and satisfies the requirements for materials which can be used in a nuclear power plant.

At the end of these operations, the collar 8, the profile of which is shown in FIG. 2 and the general shape of which is shown in FIG. 3, is obtained.

The overall thickness of the collar 8 can for example be comprised between a few millimeters and a few tens of millimeters.

This collar 8 can then be machined, directly after its manufacture or, later, during its installation on site. This machining can for example comprise a uniform cutting away of the lower and upper edges 23 and 22 of the collar 8.

Apertures 16 and/or 17 can also be drilled, following an angular distribution, through the whole thickness of the collar 8, such that these apertures can cooperate with corresponding studs of the transfer tube and/or the space between containment walls. In the example illustrated in FIG. 3, apertures 16 appear on the lower projecting part of the collar 8 and apertures 17 appear on the upper projecting part of the collar 8.

The fabric used in at least some of the plies 11 can for example be a glass fibre fabric.

With reference to FIGS. 4 to 7, a method of installation of the collar 8 around a portion of a transfer tube 1 and in contact with a separator 3 between a reactor building and a fuel building of a nuclear power plant is now described.

Figure 4:
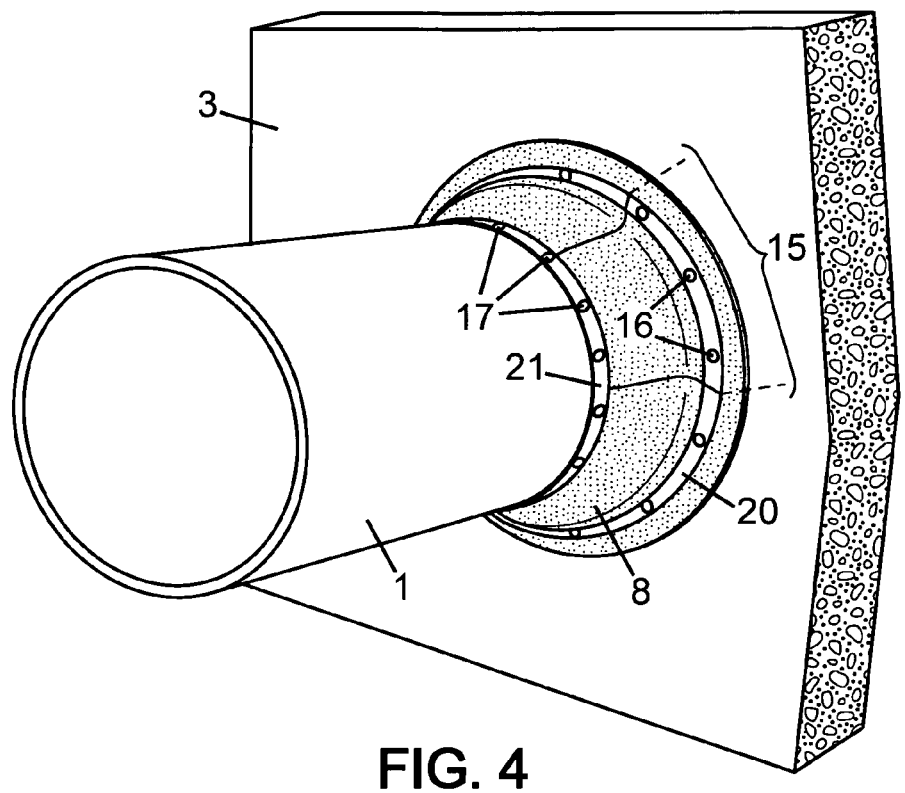
FIG. 4 is a diagram showing a collar once fitted on a tube according to the invention.

FIG. 4 shows the collar 8 in its final position when it has been fitted around the portion of the transfer tube 1 and in contact with the space between containment walls 3 which separates the reactor building and the fuel building of a nuclear power plant. The collar 8 thus has the same position as the collar 2 in FIG. 1, for which optionally it can be used as a replacement.

In the non-limitative example shown in FIG. 4, the collar 8 is firmly attached to the space between containment walls 3 by means of the reinforcement 20, and to the transfer tube 1 by means of the reinforcement 21. In this example, these reinforcements are iron hoops surrounding the collar 8 on two different circumferences. They are provided with respective apertures 16 and 17 corresponding to apertures of the collar 8. The transfer tube 1 and the space between containment walls 3 advantageously contain studs corresponding to these apertures and cooperating with them to keep the collar in place.

Means of attachment, such as joining-pieces placed on the studs of the transfer tube 1 and/or the space between containment walls 3, can advantageously be used to keep the reinforcements 20 and 21 in contact with the collar, thus preventing the collar 8 from retreating. By way of a variant, more than two reinforcements could also used to firmly attach the collar 8 to the transfer tube 1 and the space between containment walls 3.

Certain operations are advantageously carried out before the collar is fitted. These can be performed immediately after the manufacturing steps mentioned above. In this case, they form part of the method of manufacture of the collar and can be carried out in the factory. By way of a variant, they could be implemented on site. These operations are described below.

The upper layer of silicone elastomer 10 is cut open, then the fabrics of each ply 11 of the collar, such that the collar is open in a determined angular sector. Advantageously, this determined angular sector is that on which the fabrics are not impregnated with the respective layer of silicone adhesive on which they are applied as described above in a particular embodiment of the invention. In other words, with reference to FIG. 3, the layer of silicone elastomer 10 and the fabrics of the different plies 11 are cut open such that the collar 8 is open in the zone 15.

This cutting is advantageously carried out, for the layer of silicone elastomer 10 and each of the fabrics of the different plies 11, along only one of the two generatrices 18 or 19 delimiting the angular sector corresponding to the zone 15.

Figure 5:
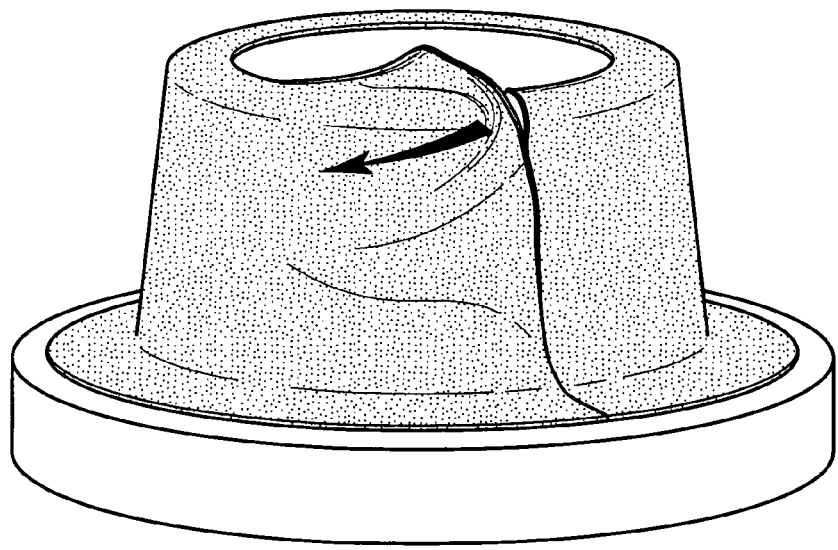
FIGS. 5 and 6 are diagrams representing successive steps with a view to the installation of a collar on a tube according to one embodiment of the invention.

Advantageously, the upper layer of silicone elastomer 10 and the fabrics of the different plies 11 are cut open alternately along one or other of the two generatrices 18 or 19, as shown in FIG. 5.

The layer of silicone elastomer 10 and the fabrics of the different plies 11 can optionally be turned back on the collar 8, by folding at the generatrix along which they have not been cut. This makes it possible to open out the collar 8 fully in the zone 15.

Thus, the layer of silicone elastomer 10 is for example turned back on the left-hand side (see FIG. 5), the fabric of the ply 11 placed directly under the layer of silicone elastomer 10 is turned back on the right-hand side (see FIG. 6), etc.

When the collar 8 comprises, as well as the layer of silicone elastomer 10, five superimposed plies 11, as shown in the example in FIG. 2, it then has three portions of fabric turned back on one side of the collar and another two portions of fabric as well as a portion of the layer of silicone elastomer turned back on the other side of the collar.

It will be noted that, in the case where each fabric was impregnated with the layer of silicone adhesive on which it is applied, over its entire internal surface, the cutting away of each ply can be trickier, although it remains possible.

The collar 8 is then introduced around the transfer tube 1 through its opening. In the example described above, the collar 8 is therefore introduced through the zone 15 which was freed by the cutting away of the layer of silicone elastomer 10 and the fabrics of the different plies 11. This introduction is relatively easy, due to the properties of the collar. While still ensuring that the collar retains the generally annular shape given it by the mould 9 during its manufacture, the silicone material used is flexible and extensible, as is the fabric.

The collar 8 can then be placed in contact with the space between containment walls 3.

It is understood that such a positioning of the collar can be carried out on any portion of the transfer tube. Thus the need to move the transfer tube, for example by removing its end from the cooling pond to slide the collar onto it, is avoided.

When the collar has been placed in contact with the space between containment walls 3, its open part is reconstituted in order to close the collar around a portion of the transfer tube. This is carried out by, for example, folding the cut fabrics and upper layer of silicone elastomer onto one another successively.

Figure 6:
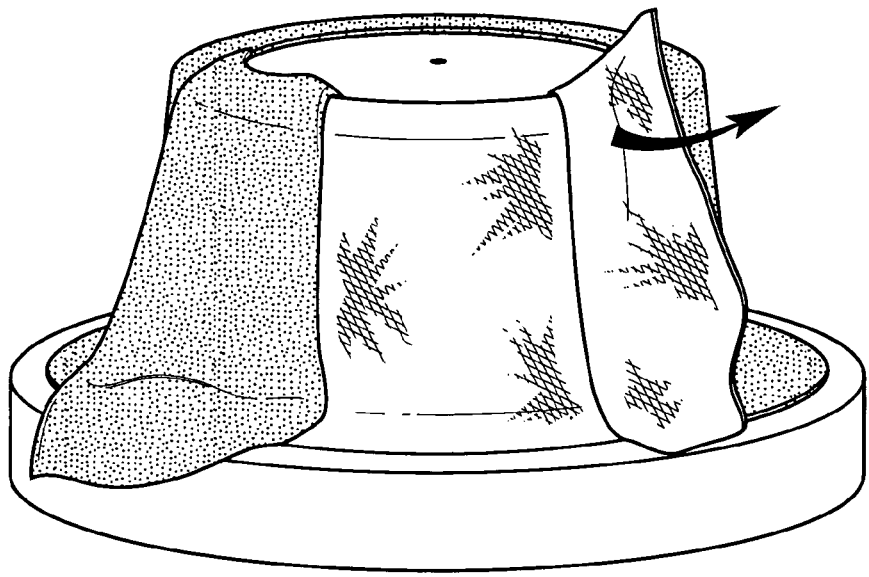
Figure 7:
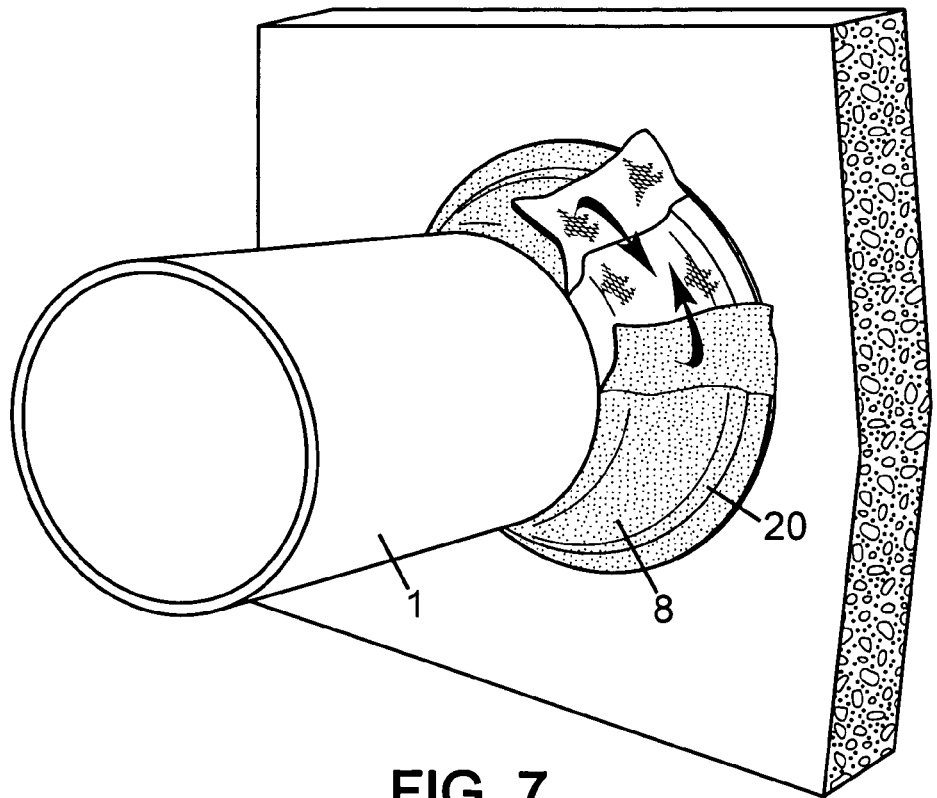
FIG. 7 is a diagram representing subsequent steps for the installation of a collar on a tube according to one embodiment of the invention.

When the cutting away was carried out according to the example described with reference to FIGS. 5 and 6, the reconstitution of the collar can then advantageously be carried out as illustrated in FIG. 7. Thus, each portion of fabric and the upper layer of silicone elastomer previously cut on the collar is folded down in turn, in reverse order to the cutting, until the collar is closed in the area where it had been open.

Advantageously, during this reconstitution, a layer of silicone adhesive is introduced to cover each fabric after it has been folded down. This layer of silicone adhesive can be similar to that of the different plies 11 of the collar, in terms of composition and/or distribution. Thus a collar can advantageously be obtained, the constitution of which is almost uniform over its entire circumference.

This operation of reconstructing the collar over its open portion is called "welding". As indicated above, it can be carried out in situ. The welding is advantageously carried out by a cold vulcanization, using the silicone adhesive mentioned above.

It is noted moreover that the properties of the components of the collar allow an effective welding. The silicone used also reduces bubbling during its application on the different fabrics, advantageously allowing a homogeneity of the collar over all portions.

When the collar 8 is provided with drilled apertures, following an angular distribution, through its whole thickness, and there are corresponding studs on the transfer tube and/or the space between containment walls, these studs are introduced into the apertures of the collar, as shown in FIG. 4. This operation can be carried out during the positioning of the collar around the transfer tube, as regards the portion of the collar excluding the opening area. As regards this opening area, the introduction of the apertures into corresponding studs of the transfer tube and/or the space between containment walls is advantageously carried out during the folding back of each previously cut away fabric and layer of silicone elastomer.

The collar thus produced therefore constitutes a reinforcement which is at once solid, resistant to a determined pressure (for example three bars for a compound comprising five layered plies), constituted exclusively of products and materials approved for use in the context of a nuclear power plant, and sufficiently flexible and extensible to allow implementation in situ on the transfer tube.

Apart from the nuclear field which was more particularly envisaged in the description above, the invention can be applied in any type of field. A collar according to the invention could thus be intended to be placed around a portion of any tube and in contact with a separator between any two spaces.

By way of non-limitative applications of examples, there can be mentioned plants for the manufacture of medicaments (where certain rooms need to be confined, isolated or sterilized while still allowing gases or fluids to enter via tubes; as the passage of these tubes through the partitions of the confined room need to be completely tight and merit a high level of security), as must the heating networks (waste incineration plants connected to the hot water network), thermal combustion power stations (coal, fuel oil or gas) comprising confined rooms crossed by tubes, the passage through which must be perfectly tight and secure.

Of course, the invention is also applicable to other situations requiring isolation and a very high-performance tightness between a confined space containing substances or a fluid (sterilized air, gases, contaminated or polluted water, etc.) which must not come into contact or mix with a fluid content in another space.

The invention claimed is:

1. Method for the installation of a collar around a portion of a tube and in contact with a separator between a first space and a second space, the collar having a generally annular shape and an open section over a determined angular sector delimited by two generatrices,
   on a section excluding the open section, the collar comprising,
     a predetermined number of superimposition of alternating layers of silicone adhesive and fabrics, and
     an upper layer of silicone elastomer,
   on the open section, the collar comprising, the predetermined number of superimposition of fabrics, and the upper layer of silicone elastomer, wherein on the open section, the upper layer of silicone elastomer and the fabrics of said layering having been cut away only alternately along one of the two generatrices and been turned back by folding at the other not-cut generatrice, such that the collar is opened onto the determined angular sector, the method comprising:

introducing the collar around the tube at the point where the collar is open, such that the collar enters into contact with the separator; and replacing the alternately cut fabrics one by one onto the determined angular sector and then the upper layer of silicone elastomer, so as to close the collar around said portion of the tube.

2. Method according to claim 1, in which, after having been placed so as to close the collar around said portion of the tube, each of the cut fabrics cut is covered with a layer of silicone adhesive.

3. Method according to claim 2, in which said layer of silicone adhesive is similar to the layers of silicone adhesive of said layering.

4. Method according to claim 1, in which the collar is provided with apertures, drilled according to an angular distribution, through the entire thickness of the collar, and in which corresponding studs of the tube and/or the separator are introduced into said apertures.

5. Method according to claim 1, in which the collar is fixed to the tube and the separator using respective reinforcements.

6. Method according to claim 1, in which sais predetermined number of alternating layers of silicone adhesive and fabrics is five.

\* \* \* \* \*